3,424,646
LAMINATED SAFETY GLASS AND PROCESS FOR MAKING SAME
Fritz Winkler, Kelkheim, Taunus, Franz Pohl, Frankfurt am Main, and Hermann Stärk, Bad Soden, Taunus, Germany, Helmut Kesseler, Cernobbio, Como, Italy, and Werner Grundmann, Hofheim, Taunus, Germany, assignors to Farbwerke Hoechst Aktiengesellschaft vormals Meister Lucius & Bruning, Frankfurt am Main, Germany, a corporation of Germany
No Drawing. Filed Aug. 13, 1965, Ser. No. 479,604
U.S. Cl. 161—199        6 Claims
Int. Cl. B32b *17/10;* C03c *27/12*

ABSTRACT OF THE DISCLOSURE

An improved method for controlling the splinter adhesion and breaking resistance of safety glass containing a polyvinyl butyral sheet as an interlayer has been provided which comprises supplementing a moisture conditioning of the interlayer prior to the lamination of said interlayer with glass sheets by adding 0.005 to 0.5% by weight, calculated on the polyvinyl butyral, of lecithin serving as anti-adhesion agent. The improved laminated safety glass is within the scope of the invention.

---

The present invention relates to improved laminated safety glass and a process for making same.

It is known that safety glass can be made by bonding two glass panes with a synthetic resin interlayer. Such panes which are also called compound glass are of interest, for example, as windshields in the automotive industry. They are used particularly to prevent injuries from splinters of glass panes destroyed in a car accident, by retaining the splinters with the help of the synthetic resin interlayer. Furthermore, it is intended that the elasticity of the safety glass reduce the impact in order to prevent the occupants of a car from being thrown through the windshield.

To meet the aforesaid requirements, the interlayer must adhere well to glass and must have a high tensile strength, a high elongation at break and satisfactory optical properties.

For the manufacture of the said interlayer plasticized polyvinyl butyral has advantageously been used for decades. It is generally used in the form of finished sheets 0.38 to 0.42 millimeter thick. To obtain unobjectionable laminated safety glass, it is not sufficient merely to compress the sheets with glass panes but a special technique which has been developed by many years of experience is required.

This can be understood when considering that splinter adhesion and breaking resistance are to a certain degree opposite properties which must be brought into agreement, as is evident from the following tests.

TEST 1

When a laminated safety glass in which the adhesion between glass panes and interlayer is only small is subjected to an impact test in which the glass is broken, coarse splinters are obtained which fly off in all directions while the interlayer remains intact and elastically intercepts the striking tool. A pane of this kind offers no protection in an emergency case since the glass splinters flying off inevitably cause heavy cuts.

TEST 2

When the same impact test is carried out using a laminated safety glass of which the glass panes adhere extremely firmly to the interlayer, the laminated safety glass bursts in the center of impact, that is the accident victim would fly head foremost through the pane and would be heavily injured by the splinters along the edge of the hole in the pane.

It is therefore necessary to adjust the adhesion of the glass panes to the interlayer between these two extremes in a manner such that, on the one hand, adhesion of the splinters is ensured as far as possible when the panes are destroyed by force while, on the other hand, the sheet between the glass panes has a certain possibility of expanding out off the fractures, a so-called slip, in the moment the glass panes break so that the kinetic energy is not exclusively concentrated on the sites of breaking in the moment of destruction but is distributed over the parts of the sheet expanding between the ruptured pieces and thereby elestically intercepted so that the sheet remains intact as far as possible and is not pierced.

It has been found, for example, that panes of this kind, in the moment of destruction, may be bent to such an extent that the deflection amounts to up to 6 to 8 centimeters and that the superficial expansion which must be brought about exclusively by the elastic sheet may amount to up to 10%.

Commercial polyvinyl butyral sheets adhere too firmly to glass if they are laid between glass panes without special preparation so that chiefly the negative result of Test 2 is obtained in the impact test.

For this reason, the adhesion of the sheet is somewhat reduced, before placing it between glass panes, by a so-called conditioning, i.e. by adjusting a definite empirically determined water content. This is done in special conditioning cabinets. For the same reason, placing the sheet between glass panes is also carried out in especially conditioned rooms.

By the above measures in combination with certain conditions that must strictly be observed during the compression of the panes, rather satisfactory laminated safety glass can be obtained. Since one cannot tell by the appearance of a finished laminated safety glass whether it is unobjectionable or not, it is officially prescribed to continuously control the manufacture of laminated safety glass by standard impact tests which are in part internationally recognized. In Germany such tests have been set forth in the directions for testing vehicle parts StV–4133 T/57 of Apr. 27, 1957, by the Federal Minister of Traffic.

The said impact tests consist, for example, in crushing panes of laminated safety glass of determined dimensions with a steel ball or a phantom having the shape of the human skull and shoulder under always the same conditions. The following characteristic impact patterns which are essential for determining the quality of the laminated glass and are valued accordingly, may be obtained.

Valuation:                Impact pattern
1 ____ Pane shows numerous initial cracks radiating from the impact center which are interrupted by a large number of circumferential cracks. The sheet has not been torn. A few fine splinters have been detached, chiefly in the impact center (cobweb).
2 ____ Besides radial initial cracks, the pane has only few circumferential cracks. The sheets has been torn at a distance of about 15 cm. from the impact center over a length of 3 to 4 cm. Splinter adhesion is not much different from that described under 1.
3 ____ Pane has up to three radial cracks, each 4 to 8 cm. long, and a small hole in the impact center.
4 ____ Pane has radial cracks up to 15 cm. long and circumferential cracks up to 10 cm. long. Pane has not been pierced.
5 ____ Pane pierced.

There may be found transition forms from one pattern to the next one, which a skilled eye can easily judge.

The impact pattern of valuation 1 corresponds to the desired optimum quality. Laminated glass of valuations 4 and 5 is unsuitable for use.

Impact tests have shown that valuation 1 has hitherto been reached relatively seldom. In general, only valuations 2 and 3 have been obtained. Impact patterns of valuations 4 and 5 have also been obtained relatively frequently in a test series.

Like in all testing methods in which the material is subjected to sudden stress, a certain percentage of poor results cannot be avoided. This can, however, no longer be tolerated in view of the increasing demands of motor traffic.

Now we have found that a considerably improved laminated safety glass can be obtained by supplementing the conditioning of polyvinyl butyral sheets by the addition of small amounts, for example 0.005 to 0.5% by weight calculated on the polyvinyl butyral of specific substances serving an anti-adhesion agents.

Examples of suitable anti-adhesion agents are the following:

(1) Hydroxyalkylation products, especially hydroxyethylation products, of higher straight-chain fatty acids with advantageously 12 to 20 carbon atoms, preferably stearic acid, which contain advantageously 30 to 40 moles of ethylene oxide in the molecule, in an amount within the range of 0.03 to 0.2% by weight, advantageously 0.05 to 0.15% by weight.

(2) Natural lecithins of vegetable or animal origin, advantageously egg lecithin or soybean lecithin, in an amount within the range of 0.001 to 0.015% by weight, advantageously 0.005 to 0.01% by weight.

(3) Higher saturated or unsaturated primary alcohols with 10 to 20 carbon atoms, advantageously dodecanol-(1), in an amount within the range of 0.05 to 0.5% by weight, advantageously 0.15 to 0.4% by weight.

The above percentage figures are calculated on pure polyvinyl butyral.

That the above substances can be used as anti-adhesion agents could be proved by the fact that when they were used in excess the results of Test 1 were obtained.

The addition of the above substances has no detrimental effect on the mechanical or optical properties or on the thermostability of the polyvinyl butyral sheet. This is also true of yellow to brown lecithins, because of the extremely small amounts required.

For the addition of these substances all methods may be used that ensure a uniform distribution of the substance in the finished sheet. The substances may be added either to the polyvinyl butyral or to the plasticizer. It is advantageous to add them to the polyvinyl butyral since, in this case, the addition can be made in the course of the manufacture of the polyvinyl butyral without substantial additional expenditure of energy. It is particularly advantageous to add the said substances to polyvinyl butyral that is still moist from the manufacture since drying can then be carried out in one working step.

The following examples serve to illustrate the invention but they are not intended to limit it thereto, the parts being by weight.

Example 1

For an exact comparison, a sufficient amount of polyvinyl butyral of a single production charge, which was still moist from the suction filter, had a water content of 55% and the following composition as determined by analysis:

Vinyl alcohol groups _____ percent__ 19.0
Vinyl acetate groups _____ percent__ 0.5
Vinyl butyral groups _____ Remainder and of which a 5% solution in ethanol containing 4% of water had a viscosity of 85 centipoises at 20° C., determined in a Höppler viscometer, was processed in the following manner:

(a) 222 parts were dried under mild conditions in a fluidized bed dryer until the water content amounted to 1 to 2% and then processed on an extruder with 40 parts of plasticizer to obtain a sheet 0.4 millimeter thick.

In this and the following tests the plasticizer was triethylene-glycol-bis-diethyl acetate.

(b) In a Henschel fluid mixer, a solution of 0.12 part of hydroxyethylated stearic acid into which 40 moles of ethylene oxide had been incorporated, in 12 parts of water was added dropwise to 222 parts of polyvinyl butyral within 15 minutes. The whole was then kept in motion for 5 minutes and then dried as described above under (a).

(c) In the manner described under (b) a solution of 0.01 part of soybean lecithin in 10 parts of water was added dropwise to 222 parts of polyvinyl butyral and the mixture so obtained was dried.

As soybean lecithin, the product "Gliddex" manufactured by Glidden Company, Jacksonville, U.S.A. was used.

(d) In the manner described above under (b) a solution of 0.25 part of dodecanol-(1) in 25 parts of methanol was added to 222 parts of polyvinyl butyral and the mixture so obtained was dried.

Like batch (a), the batches (b), (c) and (d) were made into sheets 0.4 millimeter thick with 40 parts of plasticizer, calculated on 100 parts of polyvinyl butyral.

All four sheets were simultaneously conditioned to contain 0.6% of water and used for making laminated safety glass corresponding to the prescribed standards.

The impact tests carried out on six laminated glass panes of each batch, selected as random samples, yielded the following results:

| Batch: | Valuation according to the above table |
|---|---|
| (a) | 2, 3, 2 to 3, 2 to 3, 4 to 5, 3. |
| (b) | 1, 1 to 2, 1, 1, 2 to 3, 2. |
| (c) | 1, 1, 1, 1, 1 to 2, 2. |
| (d) | 2, 1 to 2, 1 to 2, 1, 2, 1 to 2. |

All additives, particularly lecithin and dodecanol, thus considerably improve the impact strength.

To obtain an optimum effect of the additions, it is essential that the additives be distributed completely uniformly in the finished sheet. To meet this requirement, it is not absolutely necessary to use the methods described above for making test batches (b), (c) and (d). It is also possible, for example, to dissolve or suspend the oxethylated fatty acids in the plasticizer or add them in the manufacture of the polyvinyl butyral to the solution or suspension of polyvinyl alcohol to be reacted with the butyraldehyde.

The higher alcohols may also be added already during the manufacture of the polyvinyl butyral, for example, in the form of a solution in the butyraldehyde.

The lecithins may also be added to an aqueous suspension of the polyvinyl butyral or via the plasticizer. In the first mentioned case, it is advantageous to use soybean lecithins which are colloidally soluble in water. If the addition is made via the plasticizer, egg lecithin is advantageously used since it can be better suspended in the plasticizer than soybean lecithins. If the sheet is not made on an extruder but from a casting solution, the egg lecithin is simply added to the latter since it is well soluble in organic solvents, in this case in methanol, contrary to soybean lecithins.

As is known, polyvinyl butyral is obtained either by alcoholysis and simultaneous acetalization of polyvinyl esters or by acetalization following the alcoholysis of polyvinyl esters, advantageously of polyvinyl acetate to polyvinyl alcohol. The anti-adhesion agents to be used in accordance with the invention may therefore also be added to the alcoholic, advantageously methanolic, solution of the polyvinyl esters if they are soluble, or can be suspended, therein. This applies particularly for hydroxyethylated fatty acids, egg lecithin and higher alcohols.

The following example illustrates the preparation of polyvinyl butyral suitable for the manufacture of laminated safety glass by the above process.

Example 2

In a vessel provided with an effective stirrer, a heating jacket and a descending cooler, 0.18 part of dodecanol-(1) were dissolved in 1000 parts of a solution of 10% strength by weight of polyvinyl acetate of a K value of 75 in methanol (according to Fikentscher, Cellulosechemie 13, page 58 (1932)). Alcoholysis of the polyvinyl acetate to polyvinyl alcohol was then carried out by adding 3 parts of a 10% solution of sodium hydroxide in methanol at a temperature of 18 to 20° C., while stirring. After 2 hours the polyvinyl alcohol had precipitated. After the addition of a further 3 parts of a 10% solution of sodium hydroxide in methanol, half the amount of methanol and methyl acetate was distilled off. By adding water and completely expelling the residual methanol and methyl acetate, a 10% aqueous solution of polyvinyl alcohol was obtained in which the dodecanol which had been added at the beginning was uniformly distributed. To the solution so obtained there were added at 20° C., while stirring, 25.0 parts of a 78% sulfuric acid and, after 10 minutes, 35 parts of butyraldehyde. Stirring was continued at 20° C. for about 30 minutes. An aqueous suspension of polyvinyl butyral was obtained which was heated to 70° C. and stirred at that temperature for a further 2 hours. After cooling, the polyvinyl butyral was filtered off, washed and dried.

After the addition of 40%, calculated on the weight of the polyvinyl butyral, of triethylene-glycol-bis-diethyl acetate as a plasticizer, the polyvinyl butyral was made into foils which in combination with silicate glass panes yielded a laminated safety glass having the desired properties in the impact test.

We claim:
1. A process for improving laminated safety glass containing polyvinyl butyral sheet as interlayer, which comprises supplementing a moisture conditioning step of the interlayer before lamination of said interlayer with two sheets of glass by adding 0.005 to 0.5% by weight, calculated on the polyvinyl butyral, of lecithin serving as anti-adhesion agent.

2. A process for improving laminated safety glass containing a polyvinyl butyral sheet as interlayer which comprises supplementing a moisture conditioning step of the interlayer prior to the lamination of said interlayer with two sheets of glass by adding, in an amount within the range of 0.001 to 0.015% by weight, calculated on the polyvinyl butyral of lecithin.

3. A process as claimed in claim 2 wherein lecithin is added in an amount within the range of 0.005 to 0.01% by weight, calculated on the polyvinyl butyral.

4. A process as claimed in claim 2 wherein egg lecithin is used.

5. A process as claimed in claim 2 wherein soybean lecithin is used.

6. A laminated safety glass of two sheets of glass with a polyvinyl butyral sheet as interlayer, said interlayer containing 0.001 to 0.015% by weight, calculated on the polyvinyl butyral, of lecithin.

References Cited

UNITED STATES PATENTS

| | | | |
|---|---|---|---|
| 3,262,835 | 7/1966 | Lavin et al. | 161—199 |
| 3,262,836 | 7/1966 | Lavin et al. | 161—199 |
| 3,231,461 | 1/1966 | Mattimoe | 161—199 |

ROBERT F. BURNETT, *Primary Examiner.*

W. J. VAN BALEN, *Assistant Examiner.*

U.S. Cl. X.R.

260—73; 156—106